United States Patent [19]

Zimmer

[11] Patent Number: 4,991,928
[45] Date of Patent: Feb. 12, 1991

[54] MOVABLE CLAMP FOR FIBER OPTIC ENCLOSURES

[75] Inventor: Rainer M. Zimmer, Hickory, N.C.
[73] Assignee: Siecor Corporation, Hickory, N.C.
[21] Appl. No.: 481,612
[22] Filed: Feb. 20, 1990
[51] Int. Cl.[5] .............................................. G02B 6/36
[52] U.S. Cl. .................................................. 350/96.20
[58] Field of Search ............... 350/96.10, 96.15, 96.20, 350/96.21, 96.22, 320

[56] References Cited

U.S. PATENT DOCUMENTS 4,666,240 5/1987 Caron et al. ..................... 350/96.20
4,685,764 8/1987 Hoffer et al. ...................... 350/96.23
4,820,007 4/1989 Ross et al. ........................ 350/96.22

OTHER PUBLICATIONS

"Siecor Fiber Optic Splice Closures" ©1989.

Primary Examiner—Akm Ullah
Attorney, Agent, or Firm—J. David Abernethy

[57] ABSTRACT

Apparatus for securing a fiber optic cable in an enclosure includes a clip slideably mounted on a bracket. The cable strength member is clamped to the bracket in the position such that little or no bending of the strength member is necessary. A physical stop on the clip ensures that the strength member will not intrude into the splicing area over time.

7 Claims, 2 Drawing Sheets

MOVABLE CLAMP FOR FIBER OPTIC ENCLOSURES

BACKGROUND OF THE INVENTION

The field of the invention is splice and connector closures for fiber optic cables.

The size, shape, and composition of optical fibers render such fibers vulnerable to breakage or microbending due to physical tension or compression or the freezing and thawing of water. For these reasons, splices and connections of optical fibers are usually housed in secure splice closures.

Prior practice in design of such closures is to provide an area in the end caps of the closure through which craftspersons may drill a hole for cable insertion. A bracket is also provided within the enclosures having one or more fixed clamps. The craftsperson inserts the cable through a drilled hole and secures any rod-like cable strength member to a clamp. Prior art clamps consist of a plate which may be clamped to the bracket by a nut, holding the rod-like cable strength member therebetween. The rod-like strength member is prevented from pistoning into the actual splice area only by friction arising from the normal clamping force. Any fibrous cable tensile strength members, such as aramid fibers, cannot resist such pistoning out of the cable as this would be a compressive force, not a tensile force, with respect to the aramid fibers, even if the aramid fibers are also secured in the enclosure. A separate clamp around the outer sheath may prevent sheath movement into or out of the cable, but, again, does not prevent pistoning of a rod-like cable strength member.

A further difficulty with the fixed clamps is that it is difficult to line up the drill hole perfectly with the clamp. As a result, bending of the rod-like cable strength member is observed between the end cap and the clamp. Such bending seriously reduces the ability of the rod-like cable strength member to withstand compressive forces, which can lead to breakage of the rod-like cable strength member.

SUMMARY OF THE INVENTION

Therefore, objects of the invention include an enclosure clamp assembly which can be moved to accommodate the cable entry point and which includes a physical stop to prevent rigid strength member pistoning.

The invention comprises an enclosure for holding optical splices or connectors having an outer wall through which optical cables may enter; a bracket mounted in the enclosure having a slot parallel to said outer wall; and a clip slideably mounted to the bracket by a bolt inserted through the slot so that the clip can be moved to allow clamping of a cable rod-like strength member without substantial bending of the strength member. Another feature is a lip mounted to the clip which acts as a physical stop to prevent further penetration of the enclosure by the rod-like central member. The lip could also be mounted to the bracket itself or elsewhere in the enclosure as desired. An additional nut and two washers may be added to the bolt to facilitate clamping fibrous strength members separately from a rod-like strength member.

BRIEF DESCRIPTION OF THE DRAWINGS

The preferred embodiment and best mode of the invention will now be described with reference to the drawings, in which.

DETAILED DESCRIPTION OF THE PREFERRED EMBODIMENT

Figure 1:
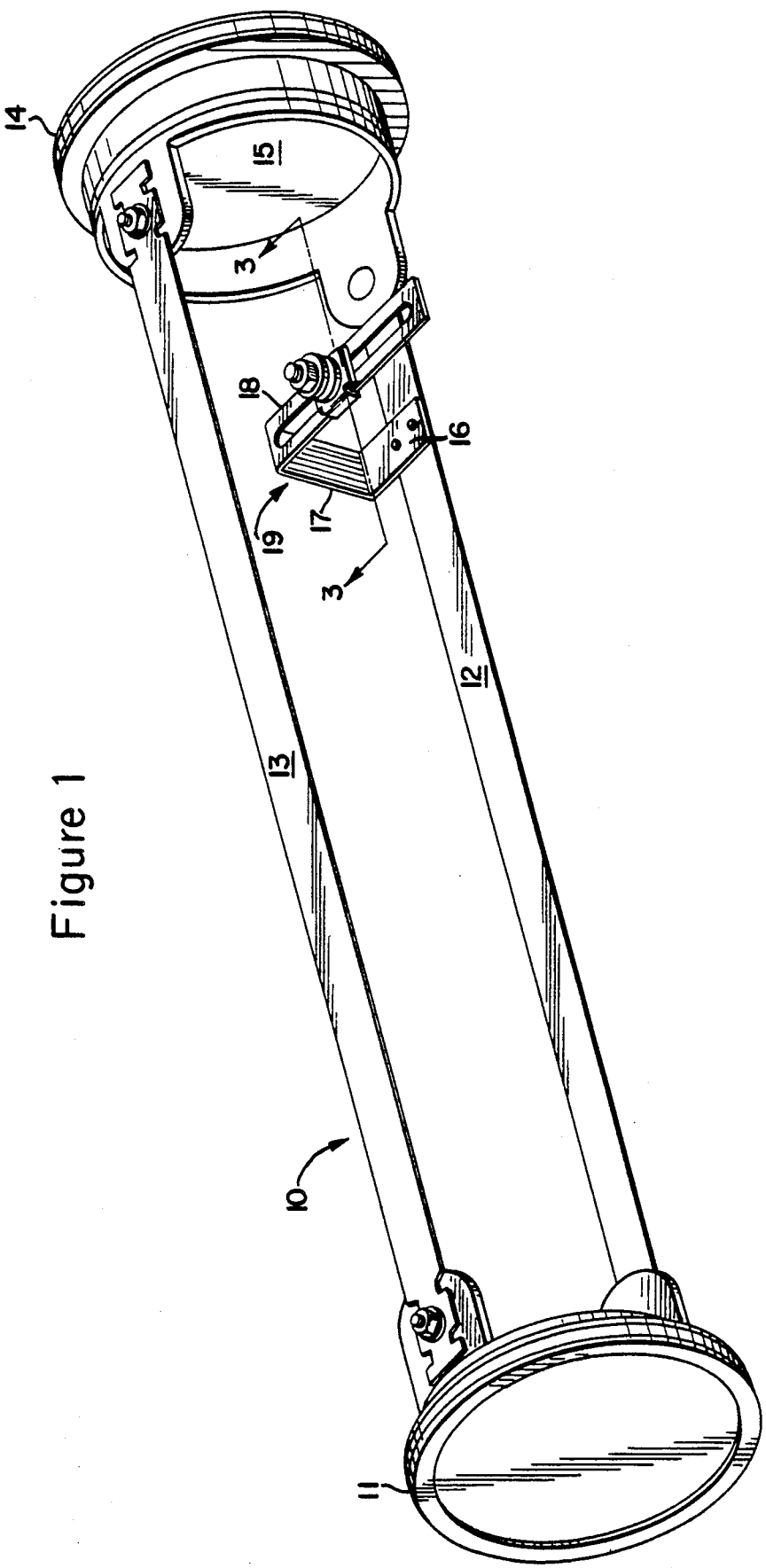
FIG. 1 is a perspective view of the bracket and clip according to the invention mounted within a splice enclosure.

Shown in FIG. 1 is clamping assembly 19 mounted to optical splice enclosure 10. Splice enclosure 10 includes end caps 11, 14 connected by rigid bars 12, 13. End cap 14 has area 15 through which a hole may be drilled to allow entry of a fiber optic cable Mounted to bar 12 of splice enclosure 10 is bracket assembly 19, including bottom plate 16, side plate 17, and top plate 18. Other elements of splice enclosure 10, such as the cylindrical outer side wall and the splicing tray, have been omitted from the drawings for the sake of clarity.

Figure 2:
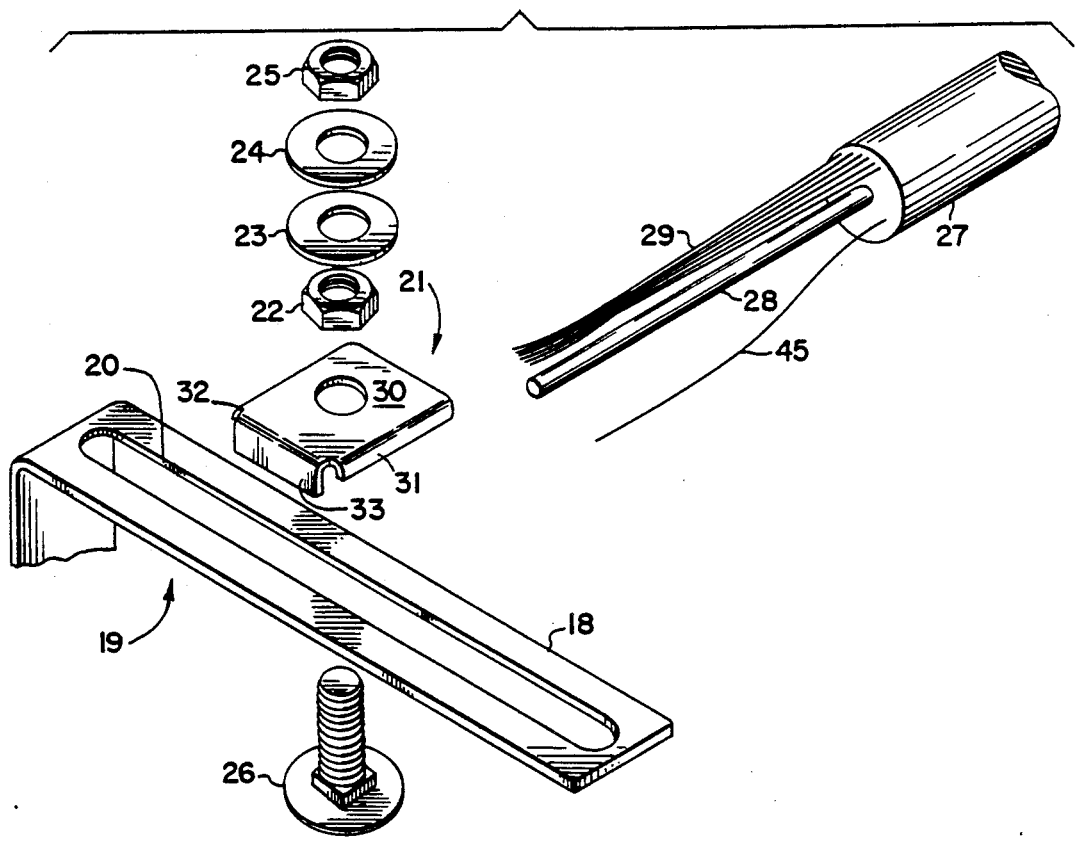
FIG. 2 is a perspective view of the various components of the bracket assembly and elements of an optical cable.

FIG. 2 shows in greater detail the elements of the top portion of the clamping assembly Fiber optic cable 27 has fiber strength members 29, optical fiber 45, and a rigid rod-like central member 28 to be secured. Optical fibers also present in the cable have been omitted for the sake of clarity. Included in bracket assembly 19 is top plate 18 having slot 20 therein which is parallel to end cap entry area 15. Carriage bolt 26 may be inserted through slot 20 in order to successively thread clip 21, nut 22, washers 23, 24, and nut 25. Clip 21 comprises plate 30, legs 31, 32, and an inner lip 33 mounted on plate 30.

Figure 3:
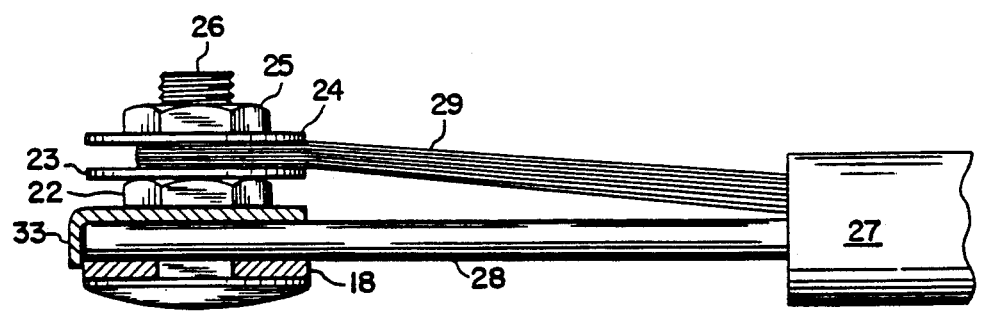
FIG. 3 is a side elevation view along line 3—3 of FIG. 1 of the cable strength elements secured by the clamping assembly.

As best shown in FIG. 3, as assembled, fiber strength members 29 are wrapped around bolt 26 and secured between washers 23, 24 by nuts 22, 25. Nut 22 also serves to clamp clip 21 to top plate 18. Clamped between clip 21 and top plate 18 is rod-like central strength member 28, which is prohibited from further entry into the enclosure area by lip 33.

The design of the clamping assembly allows the bolt, the clip, and the nuts and washers to be moved to any point along slot 20 so that no bending of strength member 28 is necessary to secure the cable.

An alternative placement for lip 33 would be as a solid continuous upstanding lip attached to the rear of top plate 18. However, material usage is minimized by attaching the lip to the clip instead, as shown in the drawings.

All of the elements of the bracket assembly are preferably made from a rigid metal in order to properly secure strength members 28, 29 of the cable. For convenience, a carriage bolt is used as bolt 26 in order to prevent turning of bolt 26 when inserted through slot 20, which allows tightening of the clamping assembly with one wrench instead of two.

Typical enclosure end caps will have a preferred specified entrance area in the center of end wall 15 through which holes may be drilled for cable entrance. This preferred area is an ellipse whose long diameter is parallel to slot 20.

If desired, another bracket assembly 19 could be mounted near end cap 11 if the network design dictates.

It should be understood that the enclosure may have a variety of shapes and outer walls through which optical cables may enter without departing from the spirit of the invention. Any such variations within the limitation of the claims can be designed according to the environment of the network.

What is claimed is:

1. Apparatus for securing a fiber optic cable having a rod-like rigid reinforcing member in an enclosure, comprising:
   (a) an enclosure for holding optical splices or connectors, the enclosure having an outer wall through which optical cables enter the enclosure;
   (b) a support member mounted in the enclosure, the support member extending parallel to the outer wall through which optical fibers enter; and,
   (c) securing means for securing a rod-like rigid reinforcing member at any of a plurality of points on the support member.

2. Apparatus as recited in claim 1, further comprising a physical stop limiting enclosure penetration by a rod-like rigid cable reinforcing member to the area between the physical stop and said wall.

3. Apparatus for securing a fiber optic cable having a rod-like rigid reinforcing member in an enclosure, comprising:
   (a) an enclosure for holding optical splices or connectors, the enclosure having an outer wall through which optical cables enter the enclosure;
   (b) a support member mounted in the enclosure, the support member extending parallel to said outer wall;
   (c) a securing means slideably mounted on the support member for securing a rod-like cable reinforcing member without appreciable bending of the cable reinforcing member; and,
   (d) a physical stop limiting enclosure penetration by the rod-like cable reinforcing member to the area between the physical stop and said wall.

4. Apparatus for securing a fiber optic cable having a rod-like rigid support member in an enclosure, comprising:
   (a) an enclosure for holding optical splices or connectors, the enclosure having an outer wall through which optical cables enter the enclosure;
   (b) a bracket mounted in the enclosure, the bracket extending parallel to the outer wall through which optical fibers may enter;
   (c) a clip comprising a plate and first and second legs mounted perpendicular to the plate;
   (d) mounting means slideably mounting the clip to the plate such that the legs, the plate, and the bracket delimit a passage having first and second exits for receiving a rod-like rigid support member; and,
   (e) a physical stop blocking the passage exit farther away from said outer wall than the other exit.

5. Apparatus as recited in claim 4, the bracket having a slot therein coextensive with said outer wall and the mounting means comprising a bolt penetrating the slot.

6. Apparatus as recited in claim 5, further comprising two nuts and two washers between the nuts threaded by the bolt.

7. Apparatus as recited in claim 4, the physical stop comprising a lip mounted to the clip.

* * * * *